(No Model.)
R. W. NELSON.
TYPE SETTING MACHINE.
No. 402,537. Patented Apr. 30, 1889.
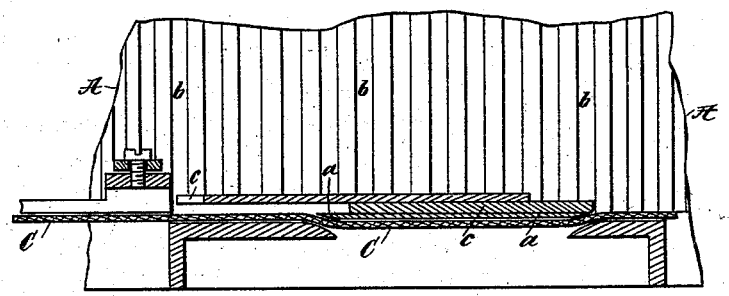
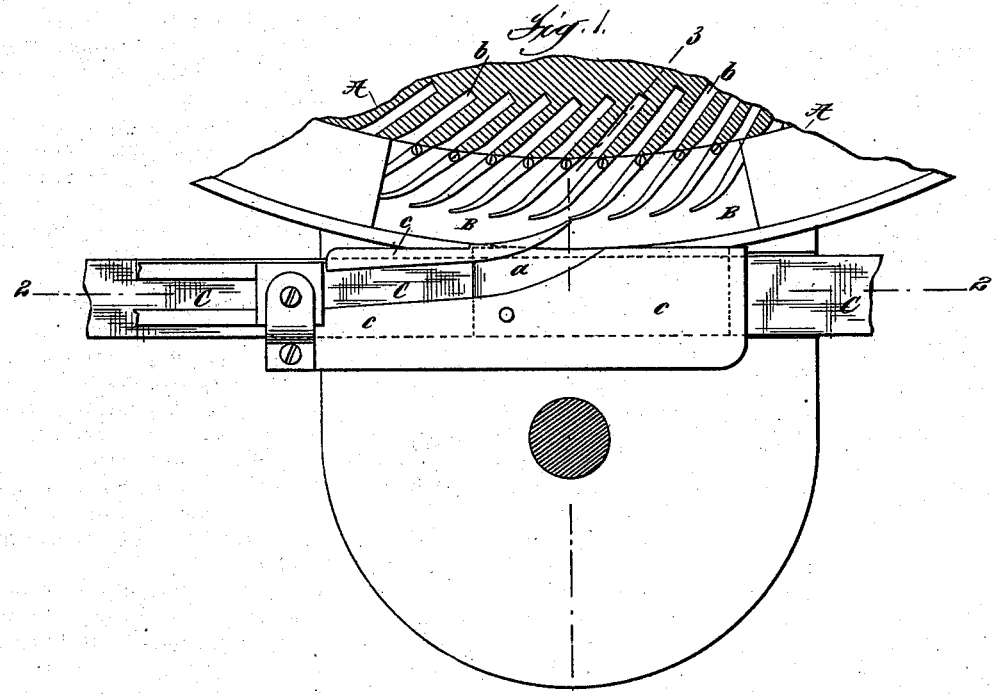
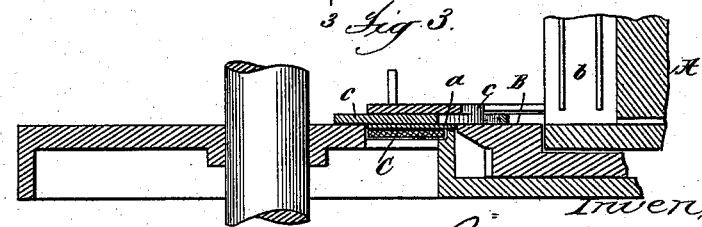
Attest:
Geo. H. Bott
J. J. Kennedy
Inventor:
Robert W. Nelson
by Philipp Phelps & Hoory
Attys

UNITED STATES PATENT OFFICE.

ROBERT W. NELSON, OF HARTFORD, CONNECTICUT, ASSIGNOR TO THE THORNE MACHINE COMPANY, OF SAME PLACE.

TYPE-SETTING MACHINE.

SPECIFICATION forming part of Letters Patent No. 402,537, dated April 30, 1889.

Application filed March 8, 1888. Serial No. 266,598. (No model.)

*To all whom it may concern:*

Be it known that I, ROBERT W. NELSON, a citizen of the United States, residing at Hartford, county of Hartford, and State of Connecticut, have invented certain new and useful Improvements in Type-Setting Machines, fully described and represented in the following specification, and the accompanying drawings forming a part of the same.

This invention relates to improvements in a type-setting machine of the class shown and described in the United States Letters Patent Nos. 232,157, 283,934, 372,186, and 372,187.

In the machine shown in said Letters Patent the type are ejected from the channels of a cylindrical composing-case onto a rapidly-revolving type-carrying table, from which, as they arrive at the proper point, they pass onto a type-conveying belt, by which they are advanced to the line-forming mechanism. In the machines as heretofore constructed the type-conveying belt ran in close proximity to the edge of the carrying-table and was so adjusted that its upper surface was as near as possible flush or on a level with the upper surface of the table, and the type passed directly from the table obliquely onto the belt. In operating the machines thus constructed it would sometimes happen that the belt, which was made of leather, would become slightly frayed or would curl up at its edge, so as to afford a slight obstruction to the type as they left the table, and this frequently caused the type to turn over, so that they would not be presented in proper position to the line-forming mechanism.

It is the object of the present invention to cure this defect, and this I have found can be effected by causing the type to pass from the table onto a stationary plate and thence onto the belt in a direction parallel with its direction of movement.

In order to more readily convey a full understanding of the invention reference is made to the accompanying drawings, in which—

Figure 1 is a plan view of a portion of the revolving type-carrying table and type-conveying belt, showing a portion of the composing-case in section. Fig. 2 is a vertical section taken on the line 2 of Fig. 1; and Fig. 3 is a similar view taken on the line 3 of the same figure.

Referring to said figures, it is to be understood that A represents the composing-case; B, the revolving type-carrying table; C, the type-conveying belt, and $c$ the side guides, which direct and retain the type upon the belt, all of which parts are constructed and operate as shown and described in the Letters Patent referred to. As shown in the said Letters Patent, the belt C is arranged so that its edge is in close proximity to the edge of the table B, with its upper surface flush or on a level with the upper surface of the table. In the present organization, however, the belt is slightly depressed at that point and passes beneath a stationary bridge-plate, $a$, which forms a continuation of the table and extends outward and forward over the belt. The bridge-plate $a$ may be supported in any suitable manner, but will preferably be made integral with or secured to one of the side guides, $c$, which serve to direct and retain the type upon the belt.

The operation of the machine thus organized is as follows: The type, as they are ejected from the channels $b$ of the composing-case, pass onto the revolving table B and are carried around upon the table until they arrive opposite the bridge-plate $a$, when they are directed obliquely off the table and onto the bridge-plate by the guide $c$. The momentum acquired by the type in being carried by the table will be sufficient to carry them across the plate $a$ and onto the belt C, where it emerges from beneath the plate, and they will then be carried forward by the belt to the line-forming mechanism. The upper surface of the plate $a$ is just flush with the upper surface of the table B, and the plate being of metal will always remain in this position, so that no obstruction will be offered to the type as they pass from the table, and as the type in passing from the plate onto the belt move in a direction parallel with the movement of the belt, no obstruction is offered at that point, and as a consequence there is nothing to cause the type to turn, and they pass forward and are presented in proper position to the line-forming mechanism.

What I claim is—

1. The combination, with the composing-case, the revolving type-carrying table, and the type-conveying belt, of the bridge-plate $a$, forming a continuation of the table and extending above the belt, substantially as described.

2. The combination, with the type-conveying belt C and the side guides, $c$, of the bridge-plate $a$, extending over the belt between the guides, substantially as described.

In testimony whereof I have hereunto set my hand in the presence of two subscribing witnesses.

R. W. NELSON.

Witnesses:
J. A. HOVEY,
T. H. PALMER.